Patented June 4, 1940

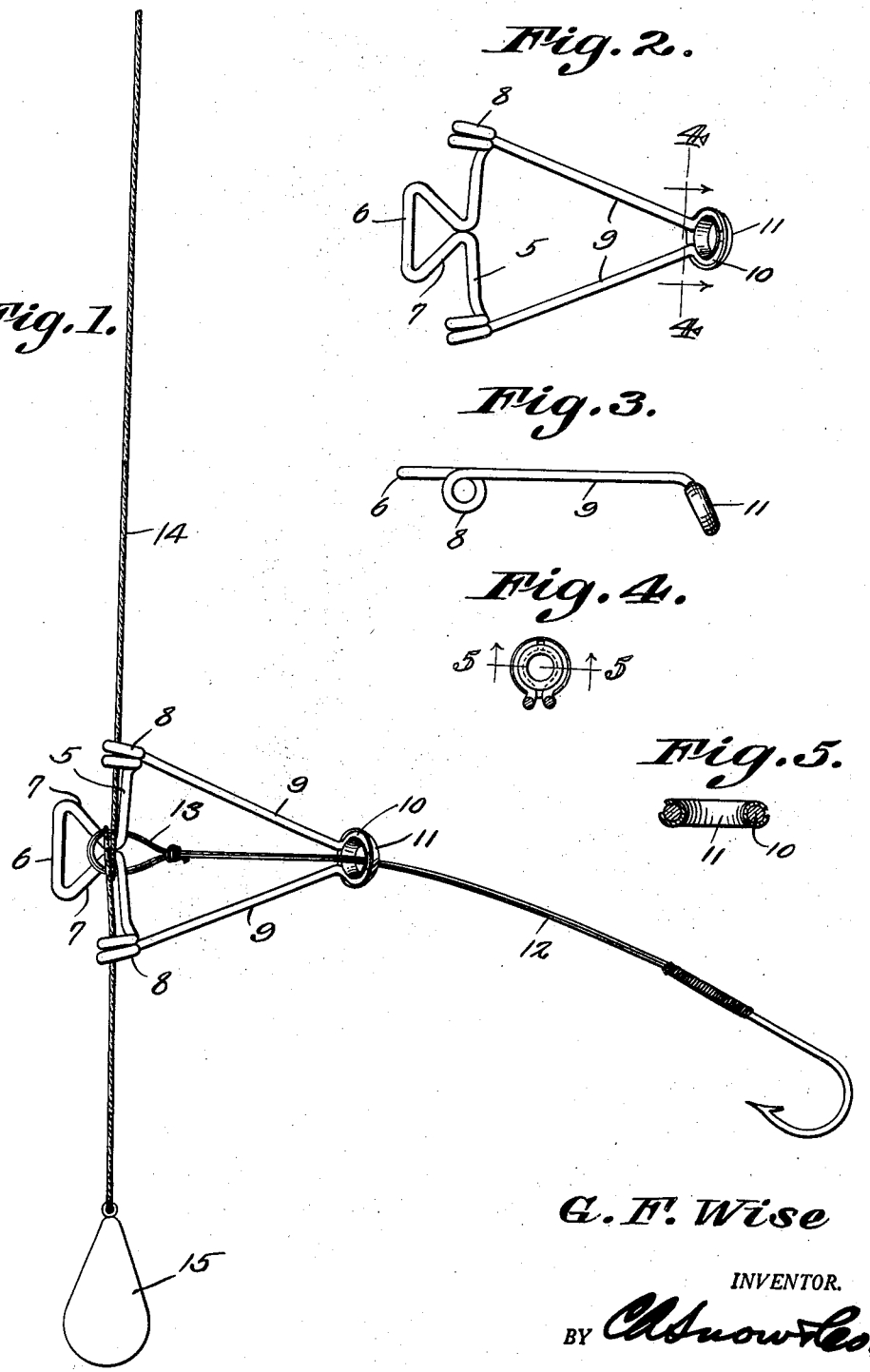

2,202,976

UNITED STATES PATENT OFFICE 2,202,976

LINE CLAMP

George F. Wise, Philadelphia, Pa.

Application June 19, 1939, Serial No. 280,005

2 Claims. (Cl. 43—28)

This invention relates to line clamps designed for use in securing fish hooks to a fishing line, an important object of the invention being to provide a clamp of this character which may be used to clamp or secure fish hooks to a line, without the necessity of tying the fish hooks in position.

Another important object of the invention is to provide a clamp which may be readily and easily adjusted longitudinally of the fishing line and with respect to the weight.

A further object of the invention is to provide means for preventing the hooks secured by the clamp, from becoming entangled with the fishing line.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of a fishing line equipped with a hook clamp, constructed in accordance with the invention.

Figure 2 is a plan view of the clamp.

Figure 3 is a side elevational view of the clamp.

Figure 4 is a sectional view taken on line 4—4 of Figure 2.

Figure 5 is a sectional view taken on line 5—5 of Figure 4.

Referring to the drawing in detail, the clamp comprises a body portion constructed of a length of wire material, bent to provide an end member 5 formed with an offset loop 6 having inclined sides 7. The end section 5 is formed with loops 8 at its ends, the loops 8 connecting the legs 9 of the clamp, to the end member 5.

The leg members 9 converge towards one end of the body portion, where they are connected by a circular portion 10 in which the eye member 11 is positioned.

The eye member 11 accommodates the usual line to which the hook is secured, the line carrying the hook being indicated by the reference character 12. The line 12 is formed with a loop 13, and in positioning the line 12 on the clamp, the loop 13 is positioned over the offset portion 6 of the clamp and pulled until the loop 13 of the line engages the clamp adjacent to the end member 5. It will of course be understood that the fishing line, which is indicated at 14, is threaded through the loops 8 at the ends of the member 5, and that after the loop 13 of the fishing hook line is positioned, the fishing line is looped around the offset portion 6 and the loop 13 of the hook line, in the manner shown by Figure 1 of the drawing.

From the foregoing it will be seen that the hook may be readily and easily removed and replaced, and may be readily adjusted longitudinally of the fishing line, to adjust the hook with respect to the weight at the end of the line. The weight in the present showing is indicated by the reference character 15.

It will also be seen that due to the construction shown and described, the hook line will be held in such spaced relation with the fishing line that all danger of the hook becoming entangled in the fishing line is eliminated.

What is claimed is:

1. A wire clamp for clamping a fish hook line having a loop, to a fishing line, comprising leg members, an end member, eyes at the ends of the end member through which a fishing line is threaded said eyes being connected to the leg members, said end member having an offset portion around which the fishing line is looped, securing the clamp to the fishing line, the loop of the hook line being positioned over the offset portion and being secured by the loop of the fishing line, and an eye connecting the free ends of the leg members through which the hook line extends.

2. A wire clamp for clamping a fishing hook line having a loop, to a fishing line, comprising an eye member, leg members diverging from the eye member, a bar connecting the diverging ends of the leg members, eye members at the ends of the bar and through which the fishing line is threaded, said bar having an offset portion with inclined sides over which the loop of the hook line is positioned, said fishing line being adapted to be looped over the offset portion and the loop of the hook line, and said hook line being adapted to extend through the first mentioned eye, so that the hook on the hook line is extended laterally from the fishing line.

GEORGE F. WISE.